Patented Oct. 10, 1933

1,929,499

UNITED STATES PATENT OFFICE 1,929,499

AQUEOUS DISPERSIONS OF RUBBER

Lester Kirschbraun, Leonia, N. J., assignor, by mesne assignments, to The Flintkote Corporation, New York, N. Y., a corporation of Massachusetts No Drawing. Application November 15, 1930
Serial No. 496,035

7 Claims. (Cl. 134—17)

This invention relates to a process of dispersing rubber in water and has as its principal object the provision of a process which will be free of the difficulties surrounding or attending the present known methods for the production of aqueous dispersions of rubber.

Several methods have hitherto been proposed for dispersing rubber in water, the general object being to form an aqueous dispersion of the rubber, which for many uses can be substituted for natural latex. These prior methods may in general, be classified in one or the other of two types. According to one of these, a colloid is first compounded on the standard rubber compounding mill in dry or moist state with the crude rubber for the purpose of aiding in the introduction of water (into the spaces between the globules composing the mass of rubber), after which the rubber mass with the colloid compounded therein is subjected to a kneading or stretching action in a mixing machine suitably constructed for the purpose, with the gradual addition of water from time to time until a stage is reached where there is an inversion of phases resulting in the formation of a pasty mass of rubber dispersed in an external phase of water. This method, however, is slow and requires most skillful manipulation particularly for the addition of the water to the mass as it is undergoing the stretching and pulling action of the mixing machine and predetermined time schedules for the water addition must be rigorously followed to insure a successful and satisfactory dispersion.

According to the other general method above alluded to the rubber is first more or less highly plasticized on a standard rubber mill and is then introduced into an aqueous paste of colloidal material in a mixing or kneading machine such as the Werner-Pfleiderer type and the dispersion of the rubber in the aqueous medium is there carried on under conditions in which the colloid is usually maintained as the external phase of the system.

This method is thus circumscribed by the necessity for first preparing the aqueous colloidal paste of proper viscosity and consistency and hence entails a separate step requiring additional time and generally also its own particular type of equipment for preparation of the aqueous colloidal paste.

I have found that aqueous dispersions of rubber may be rapidly produced by a process which avoids the difficulties and limitations of the methods heretofore suggested, and results in a simplification of the entire operation. The invention, briefly stated, consists in introducing the rubber, plasticized if desired, the colloid and the water separately and in the required relative proportions, to the mixing machine and allowing the mixing blades to continue in operation for a period of time varying from twenty to eighty or more minutes, depending upon the nature and plasticity of the rubber and upon the nature of the colloid. The mixing machine will preferably be steam jacketed so as to maintain proper temperature conditions during the dispersing operation. Generally, the temperature will vary from 140 to 190° F. depending upon the plasticity of the rubber. In most instances the less plastic rubbers will be more readily dispersed at the higher temperatures. In carrying out the invention, it is essential that the rubber be first made to wet the blades of the mixer and be thereby incipiently attenuated before the water and the colloid are introduced.

As one specific example of the process of my invention, a crude rubber such as pale crepe may first be worked on a standard rubber mill for a period of from twenty to ninety minutes until it is substantially plasticized. This step of first plasticizing the rubber should condition the rubber to such a state of plasticity that it will readily adhere to the blades of the mixer and be stretched or attenuated therebetween and while desirable for many grades of crude rubber may not be essential when dealing with the softer and normally plastic crude rubbers, such for example as Guayule or Pontianak.

After the rubber is conditioned as specified, a quantity predetermined for the batch, either in a single chunk or in several pieces is introduced into a kneading or mixing machine preferably of the two blade type such as the well known Werner-Pfleiderer mixer, and allowed or forced to be acted upon by the blades for a few minutes so that the plastic rubber will wet the blades and undergo incipient attenuation. As soon as the rubber has thus wetted the blades, the predetermined relative quantities of colloid and of water are thereupon introduced into the mixer and the latter continued in operation, for a period of time varying from twenty to eighty or so minutes, until the rubber has been uniformly dispersed as finely divided particles in the water. Should any substantial quantities of water evaporate from the mixer during the operation thereof, or, if as the rubber becomes dispersed and finer particles are formed so as to present increasing surface areas for adsorption of water, if sufficient is not originally present, the mass will thicken to a point at which coalescence may take place. In such cases, it is desirable to make further additions of water in order to maintain the batch in a heavy pasty condition so as to provide the interfacial trituration most desirable for the dispersing operation, this may of course be compensated by suitable timely additions of water. In any case sufficient water should be present at all times to continuously maintain the water as the external phase of the system and the rubber as the internal phase during the dispersion of the rubber.

I have by this relatively simple process been able to produce satisfactory dispersions of rubber in a rapid manner with the aid of a relatively small quantity of a mineral colloidal such as bentonite. In one practical embodiment of the invention I employed 200 parts of plasticized pale crepe rubber, 30 parts dry bentonite and 300 parts water. Other colloids than clay, however, may be employed in practising the invention, although in certain instances larger quantities in relation to the rubber may be necessary. Thus dextrin or glue and a minor proportion of bentonite, added separately or mixed if desired with the bentonite, or colloidal clay, may be employed in lieu of bentonite. Furthermore, the process of my invention may successfully be practised by employing coloring pigments, and/or other of the usual rubber compounding ingredients, such as barytes, zinc oxide, etc., in combination with a small amount of bentonite, to aid in effecting the dispersion. Also, if desired, asphalt and similar bitumens may be fluxed with the rubber on the rubber mill in order to condition the latter to the desired degree of plasticity, or asphalt of say 100° F. to 260° F. melting point may be charged into the mixer, which is heated, and the rubber may then be slowly introduced, the molten asphalt serving to facilitate the wetting of the mixer blades by the rubber and the conditioning of the rubber into an attenuable condition.

When dispersion is complete the consistency of the mass in the mixer will generally be rather thick or paste-like, but this condition of the product may be reduced to a more fluid one by incorporating water as desired therein, accompanied by agitation, either in the mixing machine in which the dispersion is effected or in any other manner convenient for the dilution step.

I claim as my invention:

1. In the art of manufacturing aqueous dispersions of rubber the improvement which comprises effecting incipient attenuation of a mass of rubber, adding a colloid and water without previous formation thereof as a paste to the mass while it is undergoing incipient attenuation and kneading the whole mass until the rubber becomes dispersed in the water the quantity of water present at all times being sufficient to continuously maintain the water as the external phase of the system during the dispersion of the rubber.

2. In the art of manufacturing aqueous dispersions of rubber the improvement which comprises subjecting the rubber to the action of kneading blades to effect incipient attenuation of the rubber, adding a colloid and water without previous formation thereof as a paste and continuing the kneading action until the rubber becomes dispersed in the water, the quantity of water present at all times being sufficient to continuously maintain the water as the external phase of the system during the dispersion of the rubber.

3. In the art of manufacturing aqueous dispersions of rubber the improvement which comprises causing preplasticized rubber to wet the surfaces of the blades of a kneading device and immediately after incipient attenuation of the rubber occurs, adding water and a dry colloid in predetermined proportions and without previously forming a paste thereof and continuing the kneading action until the rubber becomes dispersed in the water, the quantity of water present at all times being sufficient to continuously maintain the water as the external phase of the system during the dispersion of the rubber.

4. In the art of manufacturing aqueous dispersions of rubber the improvement which comprises effecting incipient attenuation of a mass of rubber, adding bentonite and water without previously forming a paste thereof to the mass while it is undergoing incipient attenuation and kneading the whole mass until the rubber becomes dispersed in the water, the quantity of water present at all times being sufficient to continuously maintain the water as the external phase of the system during the dispersion of the rubber.

5. In the art of manufacturing aqueous dispersions of rubber the improvement which comprises effecting incipient attenuation of a mass of rubber, adding colloidal clay and water without previously forming a paste thereof to the mass while it is undergoing incipient attenuation and kneading the whole mass until the rubber becomes dispersed in the water, the quantity of water present at all times being sufficient to continuously maintain the water as the external phase of the system during the dispersion of the rubber.

6. In the art of manufacturing aqueous dispersions of rubber the improvement which comprises effecting incipient attenuation of a mass of rubber, adding dextrin, bentonite and water without previously forming a paste thereof to the mass while it is undergoing incipient attenuation and kneading the whole mass until the rubber becomes dispersed in the water, the quantity of water present at all times being sufficient to continuously maintain the water as the external phase of the system during the dispersion of the rubber.

7. In the art of manufacturing aqueous dispersions of rubber the improvement which comprises effecting incipient attenuation of a mass of rubber, adding a rubber compounding ingredient, bentonite and water without previously forming a paste thereof to the mass while it is undergoing incipient attenuation and kneading the whole mass until the rubber becomes dispersed in the water, the quantity of water present at all times being sufficient to continuously maintain the water as the external phase of the system during the dispersion of the rubber.

LESTER KIRSCHBRAUN.